Patented Aug. 28, 1951

2,566,250

UNITED STATES PATENT OFFICE 2,566,250

NEW POLYMERS CONTAINING LACTAM UNITS IN THE POLYMER CHAIN

Delbert D. Reynolds and William O. Kenyon, Rochester, N. Y., assignors to Eastman Kodak Company, Rochester, N. Y., a corporation of New Jersey No Drawing. Application November 20, 1948, Serial No. 61,296

14 Claims. (Cl. 260—78)

This invention relates to new polymers and processes for preparing them.

It is known that maleic anhydride can be interpolymerized with vinyl-type compounds. (Voss et al., U. S. Patent 2,047,398, dated July 14, 1936.) It is also known that N-vinylphthalimide can be interpolymerized with certain vinyl-type compounds. (Hanford U. S. Patent 2,276,840, dated March 17, 1942.) We have now found that maleic anhydride can be interpolymerized with N-vinylphthalimide to give a polymer which possesses unusual and useful properties. This interpolymer can be treated according to the methods shown below to give a polymer containing lactam units, the ring of which forms a part of the polymer chain. Polymeric lactams have been previously described in Reppe et al. U. S. Patent 2,265,450, dated December 9, 1941, however, the lactam units of these polymers are substituted on the polymer chain; or in other words, the polymer chain does not pass through the lactam ring as is true of the polymers obtainable according to our invention.

It is, therefore, an object of our invention to prepare a new interpolymer of N-vinylphthalimide. A further object of our invention is to provide methods for making such an interpolymer. A still further object is to provide a new class of polymers which contain lactam units, a portion of the ring of which forms at least a part of the polymer chain. Another object is to provide methods whereby these new lactam polymers can be obtained. Still another object is to provide derivatives of these new lactams and methods for making these derivatives.

According to our invention we prepare our new interpolymer by heating a mixture of maleic anhydride and N-vinylphthalimide in the presence of a peroxide polymerization catalyst. This new interpolymer can then be hydrolyzed until substantially all of the maleic anhydride units of the polymer have been converted into maleic acid units. After "binding" the free carboxyl groups of the polymer with an appropriate salt-forming compound, the polymer can be converted into a new type of polymer containing lactam units, which form a part of the polymer chain, by treating the polymer with hydrazine. In addition to lactam units, the resulting polymer (after acidification) contains free carboxyl groups which can be esterified by known methods, if desired.

As catalysts for the polymerization of N-vinylphthalimide and maleic anhydride, we can use the catalysts customarily employed in the polymerization of vinyl-type compounds. Typical catalysts include the organic peroxides, e. g. acetyl, benzoyl, acetyl benzoyl, oleoyl, etc. peroxides, hydrogen peroxides, persulfates (e. g. the alkali metal persulfates, such as sodium, potassium, etc. persulfates), ammonium persulfates, etc.

Heat accelerates the polymerization, and temperatures varying from about 50° C. to the reflux temperature of the reactants can conveniently be employed.

Although other methods of polymerization can be used, we have found that a polymer, which is most useful for the subsequent preparation of a lactam polymer, can be obtained when the polymerization is carried out in a solvent for the maleic anhydride and N-vinylphthalimide. Such a solvent is 1,4-dioxane, although other inert solvents, e. g. benzene, toluene, n-hexane, diethyl ether, etc. can be employed. The solvent used should be in substantially anhydrous form in order to prevent any appreciable hydrolysis of the anhydride groups to acid groups. This is desirable, since we have found that maleic anhydride interpolymerizes with N-vinyl-phthalimide more readily than maleic acid. Of course, once an anhydride unit has become attached to the polymer chain, there would be no harm in having it undergo hydrolysis to carboxyl groups, since the polymer is subsequently subjected to mild hydrolyzing conditions, prior to the formation of a lactam polymer. In actual practice, even when a substantially anhydrous solvent is used in the polymerization, a polymer is obtained containing on the order of 2–3 per cent by weight of maleic acid units.

The molecular ratio of N-vinylphthalimide to maleic anhydride in the polymerization mixture can vary from about 1 to 2 molecular proportions of the N-vinylphthalimide for each molecular proportion of the maleic anhydride. Such proportions give a polymer containing N-vinylphthalimide and maleic anhydride units in a substantially 1:1 ratio. It is to be understood that when reference is made to an interpolymer of N-vinylphthalimide and maleic anhydride, both in the description and claims, a polymer which can contain in addition to the N-vinylphthalimide and maleic anhydride units as much as 2–3 per cent by weight of maleic acid units is contemplated.

N-vinyl imides of dicarboxylic acids other than phthalic acid are also useful in the preparation of interpolymers with maleic anhydride according to our invention. Such imides include N-vinylsuccinimide, N-vinylglutarimide, etc. Because of the solubility properties of its polymers, we have found that N-vinylphthalimide is especially useful.

The hydrolysis of the interpolymer of N-vinylphthalimide and maleic anhydride can advantageously be effected by heating the polymer in an aqueous dispersion in the presence of an organic tertiary amine. The organic tertiary amine employed is advantageously at least partially soluble in an aqueous medium. Typical tertiary amines include pyridine, trimethylamine, triethylamine, quinoline, etc., although amines of lesser water solubility can be used.

After the hydrolysis of the interpolymer, the polymer containing free carboxyl groups is reacted with a salt-forming agent. Typical salt-forming agents include the organic ammonium hydroxides represented by the following general formula:

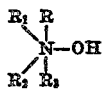

wherein R represents an alkyl group, such as methyl, ethyl, n-propyl, isopropyl, n-butyl, isobutyl, n-amyl, n-hexyl, benzyl, etc. groups (e. g. an alkyl group, especially primary or secondary alkyl groups, containing from 1 to 7 carbon atoms), or an aryl group (e. g. phenyl, α- or β-naphthyl, etc. groups) and $R_1$, $R_2$ and $R_3$ each represent alkyl groups, such as methyl, ethyl, n-propyl, isopropyl, n-butyl, isobutyl, n-amyl, n-hexyl, benzyl, etc. groups (e. g. an alkyl group, especially primary or secondary alkyl groups, containing from 1 to 7 carbon atoms). Typical organic ammonium hydroxides include tetramethyl ammonium hydroxide, tetraethyl ammonium hydroxide hydrates, benzyl triethyl ammonium hydroxide, phenyl trimethyl ammonium hydroxide, etc.

As salt-forming agents, the alkali metal hydroxides, e. g. sodium, potassium, lithium, etc. (i. e. metals of group I of the Periodic System) hydroxides, can also be advantageously used.

A substantially stoichiometrical amount (based on the number of free carboxyl groups present) of the salt-forming agent is employed, since excessive amounts might possibly open the imide ring of the polymer and produce undesired phthalamic acid units. While amounts of salt-forming agent less than the stoichiometrical amount do not lead to the formation of the undesirable phthalamic acid units, they do cause some difficulty when the polymer product resulting from the salt-forming step is treated with hydrazine.

After the polymer resulting from the salt-forming step has been reacted with hydrazine to give a polymer which contains lactam units as part of the polymer chain, the lactam polymer can be reacted with a mineral acid to liberate the carboxyl groups of the polymer from their salt forms. If desired, these free carboxyl groups can be esterified by an alcohol in the presence of an acid esterification catalyst. As alcohols for this purpose we can advantageously use methyl, ethyl, n-propyl, isopropyl, n-butyl, isobutyl, n-amyl, n-hexyl, isohexyl, 2-ethylbutyl, benzyl, etc. alcohols (e. g. an alcohol, especially primary and secondary alcohols, containing from 1 to 7 carbon atoms. As acid esterification catalysts, those customarily employed in a Fischer-type esterification can be employed. Such catalysts include hydrochloric acid, sulfuric acid, benzenesulfonic acid, p-toluenesulfonic actid, etc.

Our invention in one of its embodiments can be illustrated by the following series of equations:

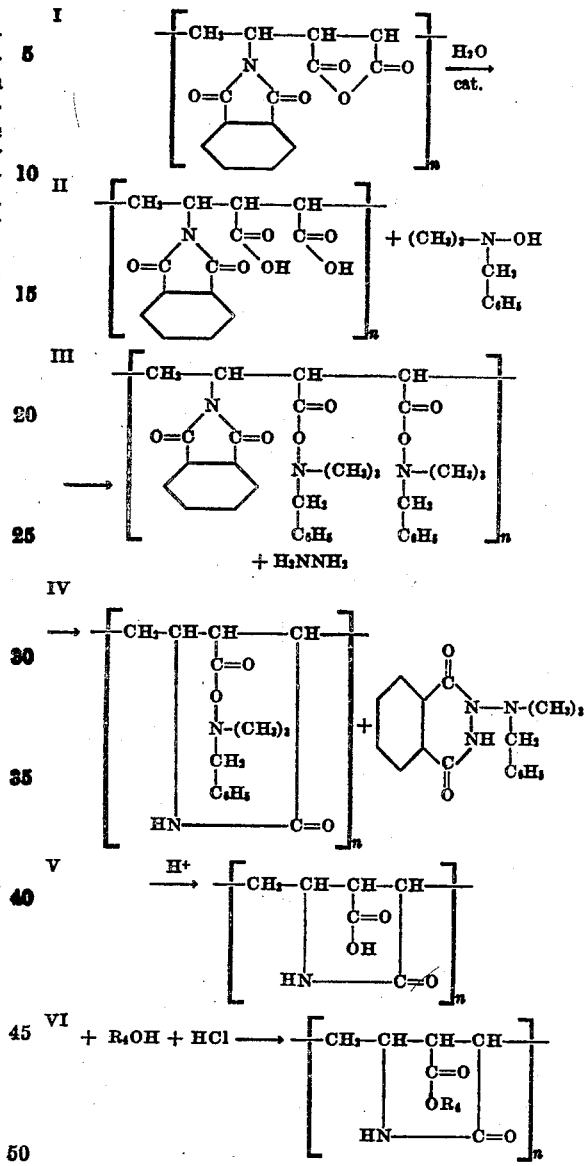

wherein $n$ represents a large whole number and $R_4$ represents an alkyl group, such as methyl, ethyl, n-propyl, isopropyl, n-butyl, isobutyl, n-amyl, n-hexyl, isohexyl, 2-ethylbutyl, benzyl, etc. groups (e. g. an alkyl group, especially primary and secondary alkyl groups, containing from 1 to 7 carbon atoms.

The following examples will illustrate more fully the manner whereby we practice our invention.

*Example 1.—Interpolymer of maleic anhydride and N-vinylphthalimide*

19.6 g. of maleic anhydride, 34.6 g. of N-vinylphthalimide and 0.1 g. of benzoyl peroxide were dissolved in 150 cc. of 1,4-dioxane, from which substantially all water had been removed. The reaction mixture was then warmed gently under reflux. The polymerization began almost immediately as evidenced by the heat evolved from the reaction. The rate of reaction was such that the reaction mixture had to be cooled by external means. After the initial polymerization reaction had subsided, the reaction mixture was heated for an additional hour on a steam bath. After cooling the reaction mixture, the reaction product was precipitated by the addition of diethyl ether. It was then separated from the supernatent liquid and dried at 125° C. On analysis the polymer was found to contain 33.2 per cent by weight maleic anhydride units and 2.06 per cent by weight maleic acid units. The theoretical amount of maleic anhydride units for a 1:1 interpolymer of maleic anhydride and N-vinylphthalimide is 36.2 per cent by weight.

*Example 2.—Benzyl trimethyl ammonium hydroxide salt of resin lactam (IV)*

A 212 g. of a maleic anhydride-N-vinylphthalimide interpolymer prepared as described in Example 1 above were slowly added to 500 cc. of a 1:1 pyridine-water solution. The mixture was warmed on a steam bath for 21 hours and then cooled to room temperature. 650 cc. of 2.54 N benzyl trimethyl ammonium hydroxide were added slowly with rapid agitation and 160 cc. of 85 per cent hydrazine hydrate were added. The reaction mixture was then heated on a steam bath for 18 hours. A 200 cc. portion of 2.54 N benzyl trimethyl ammonium hydroxide was added and the mixture heated for an additional 2 hours. The reaction mixture was then filtered and after cooling to room temperature, it was poured into a 2:1 diethyl ether-methanol solution. The resin which separated was re-dissolved in methanol containing a little water and reprecipitated into a 2:1 diethyl ether-methanol solution. The reprecipitated product was hardened by leaching in diethyl ether and then dried in a vacuum. On analysis it was found to contain 8.94 per cent by weight nitrogen, whereas the calculated value was 9.65 per cent by weight. Potentiometric titration of a 1.000 g. sample of the resinous product with standard hydrochloric acid solution required 6.5 cc. of .4789 N hydrochloric acid or 3.45 cc. of 1 N hydrochloric acid. The calculated value was 3.45 cc. of 1 N hydrochloric acid per gram.

B

In another run, 150 g. of a N-vinylphthalimide-maleic anhydride copolymer, prepared as described in Example 1, were slowly added to 400 cc. of a 1:1 pyridine-water solution. The mixture was stirred and heated for 21 hours on a steam bath at the end of which time, it was cooled to room temperature. Sufficient benzyl trimethyl ammonium hydroxide was added to react with all of the free carboxyl groups of the polymer, while the reaction mixture was stirred vigorously to avoid hydrolysis of the phthalimide groups of the polymer to phthalamine acid units. 120 cc. of hydrazine hydrate (85 per cent) was added and the reaction mixture was warmed on a steam bath for 18 hours. After filtering, the reaction mixture was poured slowly into a 2:1 diethyl ether-methanol solution. The resin which precipitated was dissolved in methanol containing a little water and then reprecipitated in a 2:1 diethyl ether-methanol solution. The reprecipitated polymer was then hardened by washing with diethyl ether in a Soxhlet extractor and dried at 60° C. It was purified further by redissolving in methanol containing a little water, filtering, and reprecipitating in diethyl ether. After drying in a vacuum, it was found on analysis to contain 9.59 per cent by weight nitrogen, whereas the theoretical amount was 9.65 per cent by weight. Potentiometric titration of a 1.000 g. of sample of the resinous product with standard hydrochloric solution required 6.5 cc. of .4789 N hydrochloric acid, or 3.45 cc. of 1 N hydrochloric acid. The calculated amount for the resin salt of Formula IV was 3.45 cc. of 1 N hydrochloric acid per gram.

*Example 3.—Resin lactam acid (V)*

A

A sample of the benzyl trimethyl ammonium hydroxide salt, prepared by the method described in Example 2, was dissolved in water and precipitated in rapidly stirred aqueous hydrochloric acid. The white resinous product was washed with distilled water until all of the hydrochloric acid had been removed and then extracted in a Soxhlet extractor with ethanol. A sodium fusion test showed that the resin contained no chlorine. The polymer was dissolved in aqueous pyridine, filtered, and reprecipitated in dilute hydrochloric acid. After again washing with distilled water, it was dried. On analysis, it was found to contain 9.91 per cent by weight nitrogen, 51.13 per cent by weight carbon and 5.28 per cent by weight hydrogen. The theoretical amounts for these elements were 9.92 per cent by weight nitrogen, 51.07 per cent by weight carbon and 4.97 per cent by weight hydrogen. Titration of a 0.5 g. sample of the polymer dissolved in a mixture of 25 cc. of pyridine and 50 cc. of distilled water required 6.1 cc. of 0.5133 N sodium hydroxide, or 6.8 cc. of 1 N sodium hydroxide per gram. The theoretical amount for the resin acid of Formula V was 7.09 cc. of 1 N sodium hydroxide per gram. To the neutralized resin lactam acid, 10 cc. of 0.5133 N sodium hydroxide were added, and the mixture was warmed on a steam bath for 18 hours. Back titration of caustic with standard hydrochloric acid showed that the lactam ring was not opened.

B

In another run, 20 g. of the resin lactam salt prepared in Example 2A were dissolved in methanol at room temperature, and dry hydrochloric acid was added. A white precipitate formed immediately. After filtering it was washed with methanol and partially dried. The partially dried product was dissolved in moist 1,4-dioxane and was precipitated in water. After washing thoroughly with distilled water it was dried over calcium chloride at room temperature.

A 1.000 g. sample of the resin acid was dissolved in a pyridine-water mixture and titrated potentiometrically with 0.5133 N sodium hydroxide in the presence of a phenolphthalein indicator. 13.7 cc. of 0.5133 N (or 7.18 cc. of 1 N) caustic were required (theoretical for 1 N caustic was 7.09 cc.). The theoretical carboxyl content was 33.0 per cent by weight, whereas the calculated amount, based on the above titration was 31.9 per cent by weight.

*Example 4.—Methyl ester of resin lactam acid (IV)*

20 g. of the resin lactam salt of Example 2A were dissolved in 200 cc. of methanol, and after heating the solution to boiling, dry hydrochloric acid gas was passed in slowly. At the end of one-half hour, a resinous product had formed. Dry hydrochloric acid was again passed into the solution for an additional hour. At this point a sample of the resin was removed. It was found to be completely soluble in a water-dioxane mixture or a water-acetone mixture. The remainder of the reaction mixture was then refluxed for 22 hours. The supernatant liquid was decanted while still hot. After digesting the resinous product in methanol, it was obtained as a fine dispersion. The methanol was distilled off under reduced pressure and the residue was dissolved in a water-acetone mixture. After filtering, the solution was poured into a 1:1 diethyl ether-methanol mixture. The precipitate was redissolved in methanol containing a little water. The product was again precipitated by pouring the solution into diethyl ether. The resinous product was then dried in a vacuum at room temperature.

A 1.000 g. sample of the resin lactam ester was dissolved in a pyridine-water mixture and titrated potentiometrically with 0.5133 N sodium hydroxide. Phenolphthalein which had been added to the solution changed color after 3.0 cc. of caustic had been added. By calculation, the resin lactam ester contained 7.03 per cent by weight carboxyl groups as compared with 31.9 per cent by weight for the unesterified resin lactam acid of Example 3B.

By replacing the methanol in the above example by a molecularly equivalent amount of n-butanol or benzyl alcohol, the corresponding n-butyl and benzyl esters can be prepared.

Other bases, e. g. sodium hydroxide, potassium hydroxide, benzyl triethyl ammonium hydroxide, etc. can advantageously be used to replace the salt-forming agent employed in Examples 2A and 2B. Maleic anhydride interpolymers with other N-vinyl imides can likewise be used to advantage in the process of our invention.

The hydrazine need not be used in the form of its hydrate as shown in the above examples. Alternatively substantially anhydrous hydrazine can be added directly to the reaction mixture or mixed with an inert solvent from which water has been removed. (1,4-dioxane), and the hydrazine used in the form of a solution. The term hydrazine as used in the description and claims is intended to define both substantially anhydrous hydrazine and hydrazine monohydrate.

Some of the resinous products of our invention can be used in forming films or textile fibers. They can also be used as gelatin substitutes or as dispersing agents for silver halides in photographic emulsions. For these latter uses, resin lactam esters containing a carbalkoxyl group which imparts water solubility or solubility in water containing some organic solvent are especially useful.

What we claim as our invention and desire secured by Letters Patent of the United States is:

1. A process for preparing a resinous, linear polymer containing lactam units in the polymer chain comprising (1) hydrolyzing a 1:1 mol. ratio interpolymer of N-vinylphthalimide and maleic anhydride until substantially all of the maleic anhydride units of the polymer have been converted to maleic acid units, (2) reacting the resulting polymer with a substantially stoichiometric amount of a salt-forming compound selected from the group consisting of alkali metal hydroxides and an organic ammonium hydroxide selected from those represented by the following general formula:

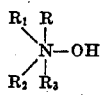

wherein R represents a member selected from the group consisting of an alkyl group and an aryl group, R₁, R₂ and R₃ each represents an alkyl group and (3) reacting the resulting polymer containing carboxylic acid salt groups with hydrazine.

2. A process for preparing a resinous, linear polymer containing lactam units in the polymer chain comprising (1) hydrolyzing a 1:1 mol. ratio interpolymer of N-vinylphthalimide and maleic anhydride until substantially all of the maleic anhydride units of the polymer have been converted to maleic acid units, (2) reacting the resulting polymer with a substantially stoichiometric amount of a salt-forming compound selected from those represented by the following general formula:

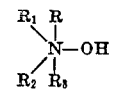

wherein R, R₁, R₂ and R₃ each represents an alkyl group containing from 1 to 7 carbon atoms, and (3) reacting the resulting polymer containing carboxylic acid salt groups with hydrazine.

3. A process for preparing a resinous, linear polymer containing lactam units in the polymer chain comprising (1) hydrolyzing a 1:1 mol. ratio interpolymer of N-vinylphthalimide and maleic anhydride until substantially all of the maleic anhydride units of the polymer have been converted to maleic acid units, (2) reacting the resulting polymer with a substantially stoichiometric amount of an alkali metal hydroxide and (3) reacting the resulting polymer containing carboxylic acid salt groups with hydrazine.

4. A process for preparing a resinous, linear polymer containing lactam units in the polymer chain comprising (1) hydrolyzing a 1:1 mol. ratio interpolymer of N-vinylphthalimide and maleic anhydride until substantially all of the maleic anhydride units of the polymer have been converted to maleic acid units, (2) reacting the resulting polymer with a substantially stoichiometric amount of benzyl trimethyl ammonium hydroxide and (3) reacting the resulting polymer containing carboxylic acid salt groups with hydrazine hydrate.

5. A process for preparing a resinous, linear polymer containing lactam units in the polymer chain comprising (1) heating a 1:1 mol. ratio interpolymer of N-vinylphthalimide and maleic anhydride in the presence of an aqueous dispersion of an organic tertiary amine until substantially all of the maleic anhydride units of the polymer have been converted to maleic acid units, (2) reacting the resulting polymer with a substantially stoichiometric amount of a salt-forming compound selected from those represented by the following general formula:

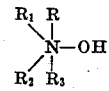

wherein R, R₁, R₂ and R₃ each represents an alkyl group containing from 1 to 7 carbon atoms, (3) reacting the resulting polymer containing carboxylic acid salt groups with hydrazine, and (4) acidifying the product thus formed.

6. A process for preparing a resinous, linear polymer containing lactam units in the polymer chain comprising (1) heating a 1:1 mol. ratio interpolymer of N-vinylphthalimide and maleic anhydride in the presence of an aqueous dispersion of an organic tertiary amine until substantially all of the maleic anhydride units of the polymer have been converted to maleic acid units, (2) reacting the resulting polymer with a substantially stoichiometric amount of an alkali metal hydroxide, (3) reacting the resulting polymer containing carboxylic acid salt groups with hydrazine, and (4) acidifying the product thus formed.

7. A process for preparing a resinous, linear polymer containing lactam units in the polymer chain comprising (1) heating a 1:1 mol. ratio interpolymer of N-vinylphthalimide and maleic anhydride in the presence of an aqueous dispersion of an organic tertiary amine until substantially all of the maleic anhydride units of the polymer have been converted to maleic acid units, (2) reacting the resulting polymer with a substantially stoichiometric amount of benzyl trimethyl ammonium hydroxide, (3) reacting the resulting polymer containing carboxylic acid salt groups with hydrazine hydrate, and (4) acidifying the product thus formed.

8. A process for preparing a resinous linear polymer containing lactam units containing a carbalkoxyl substituent comprising (1) heating a 1:1 mol. ratio interpolymer of N-vinylphthalimide and maleic anhydride in the presence of an aqueous dispersion of an organic tertiary amine until substantially all of the maleic anhydride units of the polymer have been converted to maleic acid units, (2) reacting the resulting polymer with a substantially stoichiometric amount of a salt-forming compound selected from those represented by the following general formula:

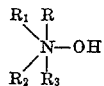

wherein R, R₁, R₂ and R₃ each represents an alkyl group containing from 1 to 7 carbon atoms, (3) reacting the resulting polymer containing carboxylic acid salt groups with hydrazine, (4) acidifying the product thus formed to give a polymeric lactam containing free carboxyl groups, and (5) heating the polymeric lactam containing free carboxyl groups in the presence of an alcohol containing from 1 to 7 carbon atoms and an acid esterification catalyst until at least a portion of the carboxyl groups have been converted into carbalkoxyl groups.

9. A process for preparing a resinous, linear polymer containing lactam units comprising (1) heating a 1:1 mol. ratio interpolymer of N-vinylphthalimide and maleic anhydride in the presence of an aqueous dispersion of an organic tertiary amine until substantially all of the maleic anhydride units of the polymer have been converted to maleic acid units, (2) reacting the resulting polymer with a substantially stoichiometric amount of benzyl trimethyl ammonium hydroxide, (3) reacting the resulting polymer containing carboxylic acid salt groups with hydrazine hydrate, (4) acidifying the product thus formed to give a polymeric lactam containing free carboxyl groups, and (5) heating the polymeric lactam containing free carboxyl groups in the presence of an alcohol containing from 1 to 7 carbon atoms and an acid esterification catalyst until at least a portion of the carboxyl groups have been converted into carbalkoxyl groups.

10. A process for preparing a resinous, linear, polymeric lactam containing in the polymer chain lactam groups represented by the following formula:

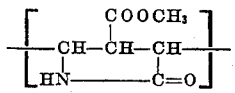

comprising (1) heating a 1:1 mol. ratio interpolymer of N-vinylphthalimide and maleic anhydride in the presence of an aqueous dispersion of an organic tertiary amine until substantially all of the maleic anhydride units of polymer have been converted to maleic acid units, (2) reacting the resulting polymer with a substantially stoichiometric amount of a salt forming compound selected from those represented by the following general formula:

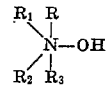

wherein R, R₁, R₂ and R₃ each represents an alkyl group containing from 1 to 7 carbon atoms, (3) reacting the resulting polymer compound containing carboxylic acid salt groups with hydrazine hydrate, (4) acidifying the product thus formed to give a polymeric lactam containing free carboxyl groups, and (5) heating the polymeric lactam containing free carboxylic acid groups in the presence of methanol and an acid esterification catalyst until at least a portion of the carboxyl groups have been converted into carbomethoxyl groups.

11. As new compositions of matter, the products obtained by the process of claim 1.

12. As new compositions of matter, the products obtained by the process of claim 5.

13. As new compositions of matter, the products obtained by the process of claim 8.

14. As new compositions of matter, the products obtained by the process of claim 10.

DELBERT D. REYNOLDS.
WILLIAM O. KENYON.

REFERENCES CITED

The following references are of record in the file of this patent:

UNITED STATES PATENTS

| Number | Name | Date |
| --- | --- | --- |
| 2,365,340 | Hanford et al. | Dec. 19, 1944 |
| 2,434,054 | Roedel | Jan. 6, 1943 |
| 2,484,423 | Reynolds et al. | Oct. 11, 1949 |

OTHER REFERENCES

Jones; Jour. Oreg. Chem., pages 500–512, November 1944.